Figure 1:
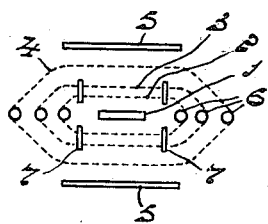

July 6, 1948.  J. L. H. JONKER  2,444,740
ELECTRODE STRUCTURE FOR MULTIGRID
ELECTRON DISCHARGE TUBES
Filed July 20, 1946

INVENTOR
JOHAN LODEWIJK HENDRIK JONKER
BY
AGENT

Patented July 6, 1948

2,444,740

UNITED STATES PATENT OFFICE 2,444,740

ELECTRODE STRUCTURE FOR MULTIGRID ELECTRON DISCHARGE TUBES

Johan Lodewijk Hendrik Jonker, Eindhoven, Netherlands, assignor to Hartford National Bank and Trust Company, Hartford, Conn., trustee Application July 20, 1946, Serial No. 685,156
In the Netherlands September 10, 1943

Section 1, Public Law 690, August 8, 1946
Patent expires September 10, 1963

3 Claims. (Cl. 250—27.5)

This invention relates to electric discharge tubes comprising a plurality of grids, and more particularly to the fixation of the wires of at least two successive grids with respect to each other.

In many cases it is advantageous that the wires of successive grids should be exactly fixed with respect to one another. This involves difficulties in particular when the grids are arranged close behind one another, since in this case a small deviation in the position of the grid wires implies a comparatively great variation in the distance between the two grids. In the case of such grids arranged close behind one another the fixation of the grid wires is very difficult, however, the more so as with mutual distances of the order of magnitude of, say, 0.3 mm. the use of very thin grid wires is required. Since such wires exhibit a small mechanical rigidity, the above-mentioned drawback will occur to a greater extent. Consequently, one would have to proceed to utilizing a plurality of supporting bars per grid, but in this case there arises a drawback that, due to the small spacing, the supporting rods, which would be arranged in the vicinity of the active grid parts, would likewise have to be very thin, so that their rigidity is small. It is known, indeed, to provide very thin cross rods supported completely by the grid wires, but these rods can serve only for the relative fixation of the wires of one grid and not for the relative fixation of wires of successive grids.

According to the invention, the said drawbacks are obviated by that in an electric discharge tube comprising an electrode system having a plurality of grids the grid wires of at least two successive grids are relatively fixed by means of templets of insulating material, comprising notches in which bear the grid wires of the said successive grids.

The templets may have the shape of narrow strips comprising at one or at each longitudinal side cavities or notches in which the wires of the successive grids are located. Such templets may be arranged in a simple manner between the grids by that the supporting rods of the outer of the two grids are slightly pressed towards each other, due to which the wires of this grid take a somewhat convexer form, so that the strips can be pushed between the two grids. After releasing the supporting rods, the templets are clamped between the grid wires.

Further, it is possible to wind the grids on the templets themselves, so that they also constitute the supporting rods for the grids. To this end, the templets at one of their longitudinal sides alternately comprises deep and shallow notches in which the wires of the successive grids are wound, i. e., the wires of the inner grid in the deep notches and those of the following grid in the shallow ones. By means of an inclined position of the deep notches it may be ensured that the bottom of these notches lies exactly under that of the shallow notches, so that the wires of the two grids are located behind each other. The form pieces may be fixed in the insulating centreing plates of the electrode system or in another manner.

In order that the invention may be clearly understood and readily carried into effect, it will be described more fully with reference to the accompanying drawing.

Figure 2:
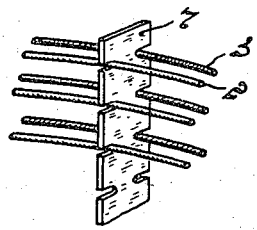
Figure 3:
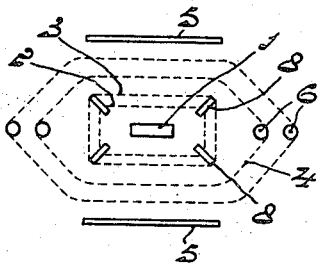
Figure 4:
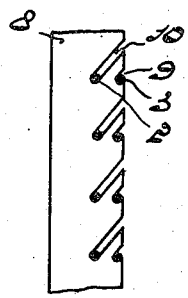

Fig. 1 is a cross-sectional view,
Fig. 2 shows a detail of a form of construction according to the invention.
Fig. 3 is a cross-sectional view, and
Fig. 4 is a detail of another form of construction according to the invention.

In Fig. 1, reference 1 indicates the cathode, 2, 3 and 4 grids, 5 an anode. The grids 2, 3 and 4 are wound on supporting rods 6. The wires of the grids 2 and 3 are exactly positioned with respect to each other and are fixed in this position by templets 7 of insulating material, for example, of steatite, magnesium oxide, mica, or similar material. These templets may be shaped in the form shown in Fig. 2. It is evident that more grids may be present and that the wires of more than two grids may be relatively fixed in the said manner.

Fig. 3 shows a tube containing four grids in which, as before, the grid wires of grids 2 and 3 must be relatively fixed. This is ensured in this case by means of strip-shaped members 8 alternately comprising at one longitudinal side a certain number of shallow and deep notches 9 and 10 respectively. The grids 2 and 3 are wound on these members in such manner that the wires of grid 2 are located in the deep notches and those of grid 3 in the shallow notches 9. By means of an inclined position of the deep notches 10, it may be ensured that the wires 2 and 3 are located behind each other. The spacing of 2 and 3 may be very small. The members 8 may be fixed in the centreing plates at the extremities of the electrode system. It is, however, also possible to provide the grids 2 and 3 with ordinary supporting rods 6 which in this case may be arranged in the plane of the other rods 6.

Although only two forms of construction are shown it is evident that according to the invention templets of different shape can also be used.

What I claim is:

1. An electrode structure for a multigrid electron discharge tube having a plurality of grids mounted one behind the other, comprising a plurality of grid supports and a plurality of grid elements on said grid supports, each of said supports comprising an insulating member having a plurality of notches spaced along a single longitudinal side thereof, said notches being positioned in successive groupings and successive notches of said groupings being of successively varying depths, the innermost extremities of said notches of each of said groupings being located on a line normal to said longitudinal side of said insulating member to fix the position of said grid elements.

2. An electrode structure for a multigrid electron discharge tube having the successive grids thereof mounted with the grid adjacent the electron discharge means shadowing the successive grids therefrom, comprising a plurality of grid supporting members and a plurality of grid wires on said members, each of said members comprising an insulating member having reentrant portions spaced along a single longitudinal side thereof, said reentrant portions being positioned in successive groupings and being of successively varying depths, the innermost extremities of said reentrant portions of each of said groupings being located in a line normal to said longitudinal side to fix said grids one behind the other.

3. An electrode structure for a multigrid electron discharge tube having two grids mounted one behind the other on a line normal to a source of electrons, comprising a cathode element, a plurality of grid supports, a plurality of grid elements on said grid supports to form said grids, and means to position said supports with said grids surrounding said cathode element, each of said supports comprising an insulating member having a plurality of notches at an angle to and spaced along a single longitudinal side thereof, said notches being positioned in pairs and one notch of each of said pairs being deeper than the other to locate the innermost extremities of the notches of each of said pairs in a line normal to said cathode element.

JOHAN LODEWIJK HENDRIK JONKER.

REFERENCES CITED

The following references are of record in the file of this patent:

UNITED STATES PATENTS

| Number | Name | Date |
| --- | --- | --- |
| Re. 21,153 | Hazeltine | July 18, 1939 |
| 2,172,750 | Hazeltine | Sept. 12, 1939 |